US011840956B2

(12) United States Patent
Yoo et al.

(10) Patent No.: US 11,840,956 B2
(45) Date of Patent: Dec. 12, 2023

(54) HEAT EXCHANGER WITH AN IMPROVED CORE SUPPORT STRUCTURE

(71) Applicant: Hanon Systems, Daejeon (KR)

(72) Inventors: Seok Jong Yoo, Daejeon (KR); Byeong Hun Kang, Daejeon (KR)

(73) Assignee: Hanon Systems, Daejeon (KR)

( * ) Notice: Subject to any disclaimer, the term of this patent is extended or adjusted under 35 U.S.C. 154(b) by 152 days.

(21) Appl. No.: 17/611,279

(22) PCT Filed: May 14, 2020

(86) PCT No.: PCT/KR2020/006338
§ 371 (c)(1),
(2) Date: Nov. 15, 2021

(87) PCT Pub. No.: WO2020/235856
PCT Pub. Date: Nov. 26, 2020

(65) Prior Publication Data
US 2022/0213834 A1 Jul. 7, 2022

(30) Foreign Application Priority Data
May 21, 2019 (KR) .......................... 10-2019-0059367

(51) Int. Cl.
*F28F 9/013* (2006.01)
*F28F 9/02* (2006.01)
(Continued)

(52) U.S. Cl.
CPC ................ *F02B 29/04* (2013.01); *F28D 7/10* (2013.01); *F28F 9/001* (2013.01); *F28F 9/013* (2013.01);
(Continued)

(58) Field of Classification Search
CPC ...... F28F 2265/30; F28F 9/0131; F28F 9/001; F28D 2021/0082
See application file for complete search history.

(56) References Cited

U.S. PATENT DOCUMENTS 4,903,762 A * 2/1990 Marsais ................ F28F 9/002
165/149
6,474,408 B1 * 11/2002 Yeh ....................... F28F 9/0236
165/81
(Continued)

FOREIGN PATENT DOCUMENTS

JP 2003322489 A 11/2003
JP 2013011175 A 1/2013
(Continued)

OTHER PUBLICATIONS

International Search Report issued in PCT/KR2020/006338 dated Aug. 10, 2020.

*Primary Examiner* — Paul Alvare
(74) *Attorney, Agent, or Firm* — Norton Rose Fulbright US LLP; James R. Crawford

(57) ABSTRACT

A heat exchanger having a core portion in which cooling water is stored and flows; an upper reinforcing plate coupled to the upper end of the core portion, having an inlet pipe and an outlet pipe connected to the core portion, and having a joining portion for fixation; a lower reinforcing plate coupled to the lower end of the core portion; a first support portion which is coupled to one lengthwise side of the lower surface of the lower reinforcing plate and can absorb vibration; and a second support portion which is coupled to the other lengthwise side of the lower surface of the lower reinforcing plate and can absorb vibration, so that the core portion can be firmly coupled to a housing.

16 Claims, 8 Drawing Sheets

(51) Int. Cl.
    *F02B 29/04*     (2006.01)
    *F28D 7/10*     (2006.01)
    *F28F 9/00*     (2006.01)
    *F28D 21/00*     (2006.01)

(52) U.S. Cl.
    CPC .... *F28F 9/0246* (2013.01); *F28D 2021/0082* (2013.01); *F28F 2265/30* (2013.01); *F28F 2275/143* (2013.01)

(56) References Cited

U.S. PATENT DOCUMENTS

| | | | |
|---|---|---|---|
| 8,695,574 B2 * | 4/2014 | Nguyen | F28F 9/001 |
| | | | 123/542 |
| 9,951,677 B2 * | 4/2018 | Bruggesser | F28D 7/1623 |
| 2007/0175617 A1 * | 8/2007 | Brost | F28F 9/0075 |
| | | | 165/149 |
| 2009/0014153 A1 * | 1/2009 | Pimentel | F28D 9/0056 |
| | | | 165/67 |
| 2015/0068717 A1 * | 3/2015 | Gluck | F28D 1/0341 |
| | | | 29/890.039 |
| 2015/0129168 A1 * | 5/2015 | Odillard | F28F 9/262 |
| | | | 165/71 |
| 2015/0168076 A1 * | 6/2015 | Ferlay | F28D 9/0062 |
| | | | 165/166 |
| 2017/0370651 A1 * | 12/2017 | Somhorst | F28D 9/0043 |
| 2018/0195431 A1 * | 7/2018 | Yoo | F28F 9/001 |

FOREIGN PATENT DOCUMENTS

| | | |
|---|---|---|
| KR | 101116844 B1 | 3/2012 |
| KR | 20190046722 A | 5/2019 |
| WO | 2018046814 A1 | 3/2018 |

\* cited by examiner

HEAT EXCHANGER WITH AN IMPROVED CORE SUPPORT STRUCTURE

CROSS REFERENCE TO RELATED APPLICATIONS

This application is a national phase under 35 U.S.C. § 371 of International Application No. PCT/KR2020/006338 filed on May 14, 2020, which claims the benefit of priority from Korean Patent Application No. 10-2019-0059367 filed on May 21, 2019. The entire contents of these applications are incorporated herein by reference in their entirety.

TECHNICAL FIELD

The present invention relates to a heat exchanger, and more particularly, to a heat exchanger capable of cooling air compressed at a high temperature and a high pressure by a turbo charger in order to increase an output of an engine.

BACKGROUND ART

Among heat exchangers, an intercooler is a device that cools air compressed at a high temperature and a high pressure by a turbo charger in order to increase an output of an engine.

A temperature of the air rapidly compressed by the turbo charger becomes very high, such that a volume is expanded and an oxygen density is decreased, resulting in a decrease in filling efficiency in a cylinder. Therefore, the intercooler cools the high-temperature air compressed in the turbo charger to increase suction efficiency of the cylinder of the engine and improve combustion efficiency, thereby increasing fuel efficiency.

The intercooler playing such a role may be divided into a water-cooled intercooler and an air-cooled intercooler according to a cooling method. Among them, the water-cooled intercooler 10 is similar in principle to the air-cooled intercooler, but is different from the air-cooled intercooler in that it cools the compressed air using cooling water of a vehicle, water, or the like, instead of external air at the time of cooling the intercooler through which the high-temperature air passes.

A water-cooled intercooler 10 illustrated in FIG. 1 includes: a first header tank 20 and a second header tank 30 spaced apart from each other by a predetermined distance and formed in parallel; a first inlet pipe 40 which is formed in the first header tank 20 and through which air is introduced and a first outlet pipe 50 which is formed in the second header tank 30 and through which air is discharged; a plurality of tubes 60 having both ends fixed to the first header tank 40 and the second header tank 50 to form an air passage; fins 70 interposed between the tubes 60; a cover member 80 accommodating an assembly of the tubes 60 and the fins 70 and opened at one side surface thereof on which one ends of the tubes 60 are positioned and the other side surface thereof; a second inlet pipe 41 which is formed on one side surface of the cover member 80 and through which cooling water is introduced and a second outlet pipe 51 which is formed on one side surface of the cover member 80 and through which the cooling water is discharged.

In addition, on the contrary, cooling water passes through the insides of tubes, and a core of a heat exchanger, which is an assembly in which header tanks, tubes and fins are assembled, is disposed inside, and a housing is formed to surround the core, such that air may be cooled by the core while passing through the inside of the housing.

However, when such a water-cooled intercooler is installed and used in the vehicle, vibrations are applied to the core disposed inside the housing due to vibrations of the engine or vibrations transferred from a road surface. As a result, a portion in which stress is concentrated may occur in the core, resulting in damage to the core.

RELATED ART DOCUMENT

Patent Document

KR 10-1116844 B1 (2012 Feb. 8)

DISCLOSURE

Technical Problem

An object of the present invention is to provide a heat exchanger with improved durability against vibrations of a vehicle by improving a support structure of a core portion of the heat exchanger to allow the core portion to be firmly coupled to a housing.

Technical Solution

In one general aspect, a heat exchanger includes: a core portion including an inlet tank portion and an outlet tank portion in which spaces in which cooling water is stored and flows are formed and a plurality of tubes each having one end connected to the inlet tank portion and the other end connected to the outlet tank portion to form a flow passage through which the cooling water flows; an upper reinforcing plate coupled to an upper end of the core portion, having an inlet pipe and an outlet pipe formed to communicate with the inlet tank portion and the outlet tank portion, respectively, and having coupling portions formed for fixation; a lower reinforcing plate coupled to a lower end of the core portion; a first support portion coupled to one side of the lower reinforcing plate in a length direction on a lower surface of the lower reinforcing plate and absorbing vibrations; and a second support portion coupled to the other side of the lower reinforcing plate in the length direction on a lower surface of the lower reinforcing plate and absorbing vibrations.

In addition, the first support portion may be formed to be longer in a width direction than in the length direction, and the second support portion may be formed to be longer in the length direction than the width direction.

In addition, an extension line of a long axis of the first support portion and an extension line of a long axis of the second support portion may intersect each other.

In addition, the extension lines may be perpendicular to a central axis direction of the coupling portions of the upper reinforcing plate.

In addition, the first support portion may include: a first bracket coupled to the lower reinforcing plate and a first anti-vibration member fitted onto the first bracket.

In addition, the first bracket may have a hooking protrusion protruding from a side surface of a portion onto which the first anti-vibration member is fitted and the first anti-vibration member may have a hooking groove formed at a position corresponding to the hooking protrusion, and the hooking protrusion may be inserted and hooked into the hooking groove.

In addition, the first bracket may include a reinforcing plate coupling portion coupled to the lower reinforcing plate and a protruding portion extending downward from the reinforcing plate coupling portion.

In addition, the first bracket may be formed by bending one flat plate.

In addition, the first bracket may have connection portions formed to connect the reinforcing plate coupling portion and the protruding portion to each other.

In addition, the first anti-vibration member may have a plurality of support protrusions protruding from at least one of side surfaces thereof in a width direction or the length direction, and the support protrusions may extend along a height direction.

In addition, the second support portion may include: a second bracket coupled to the lower reinforcing plate and a second anti-vibration member fitted onto the second bracket.

In addition, the second bracket may have a hooking protrusion protruding from a side surface of a portion onto which the second anti-vibration member is fitted and the second anti-vibration member may have a hooking groove formed at a position corresponding to the hooking protrusion, and the hooking protrusion may be inserted and hooked into the hooking groove.

In addition, the second bracket may include a reinforcing plate coupling portion coupled to the lower reinforcing plate and a protruding portion extending downward from the reinforcing plate coupling portion.

In addition, the second bracket may be formed by bending one flat plate.

In addition, the second bracket may have connection portions formed to connect the reinforcing plate coupling portion and the protruding portion to each other.

In addition, the second anti-vibration member may have a plurality of support protrusions protruding from at least one of side surfaces thereof in a width direction or the length direction, and the support protrusions may extend along a height direction.

In addition, the heat exchanger may further include a housing formed in a concave container shape, having an air inlet which is formed on one side thereof and through which air is introduced, and having an air outlet which is formed on the other side thereof and through which the air is discharged, wherein the core portion is inserted and accommodated into a concave inner portion of the housing, the upper reinforcing plate is coupled and fixed to an upper end portion of the housing, and the first support portion and the second support portion are in contact with and supported by an inner bottom of the housing.

In addition, the housing may have insertion grooves concavely formed in an inner bottom surface thereof at positions corresponding to the first support portion and the second support portion, and the first support portion and the second support portion may be inserted into and supported by the insertion grooves, respectively.

Advantageous Effects

In the heat exchange according to the present invention, a support structure of the core portion of the heat exchanger is improved, such that durability of the heat exchanger against vibrations of an engine or vibrations transferred from a road surface is improved when the heat exchanger is mounted and used in a vehicle.

BEST MODE

Hereinafter, a heat exchanger according to the present invention having the configuration as described above will be described in detail with reference to the accompanying drawings.

Figure 1:
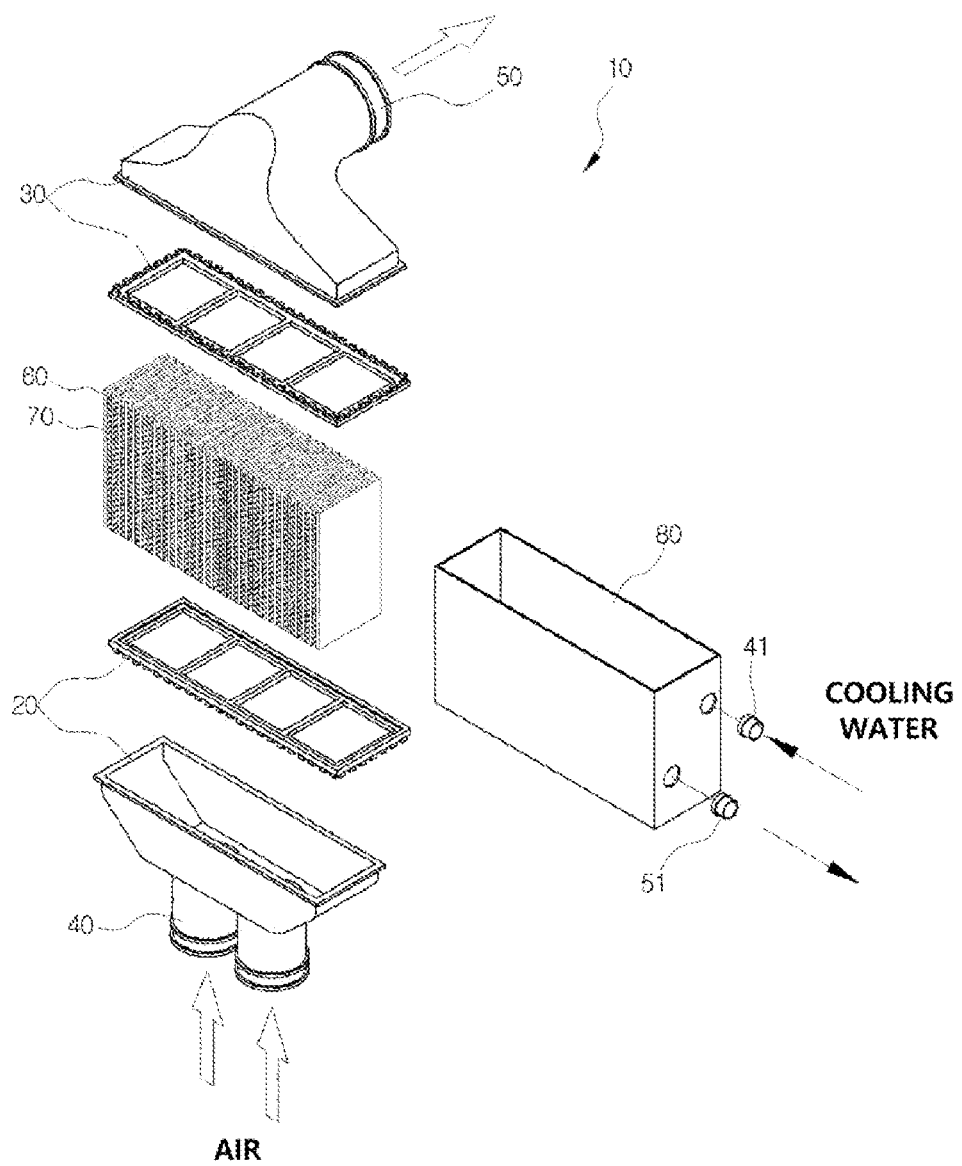
FIG. 1 is an exploded perspective view illustrating a conventional water-cooled intercooler.
Figure 2:
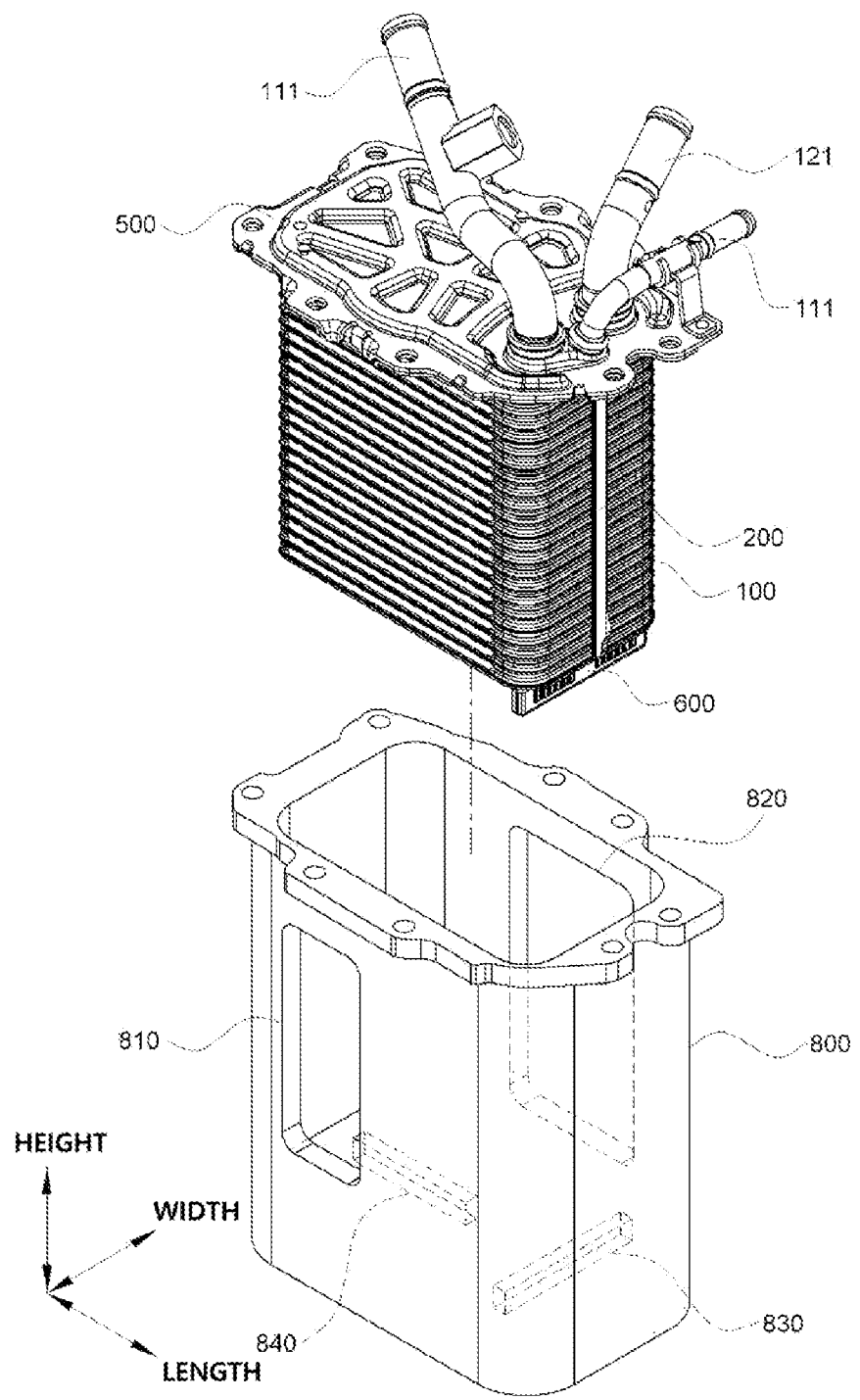
FIGS. 2 to 4 are an exploded perspective view and an assembled perspective view illustrating a heat exchanger according to an embodiment of the present invention.
Figure 3:
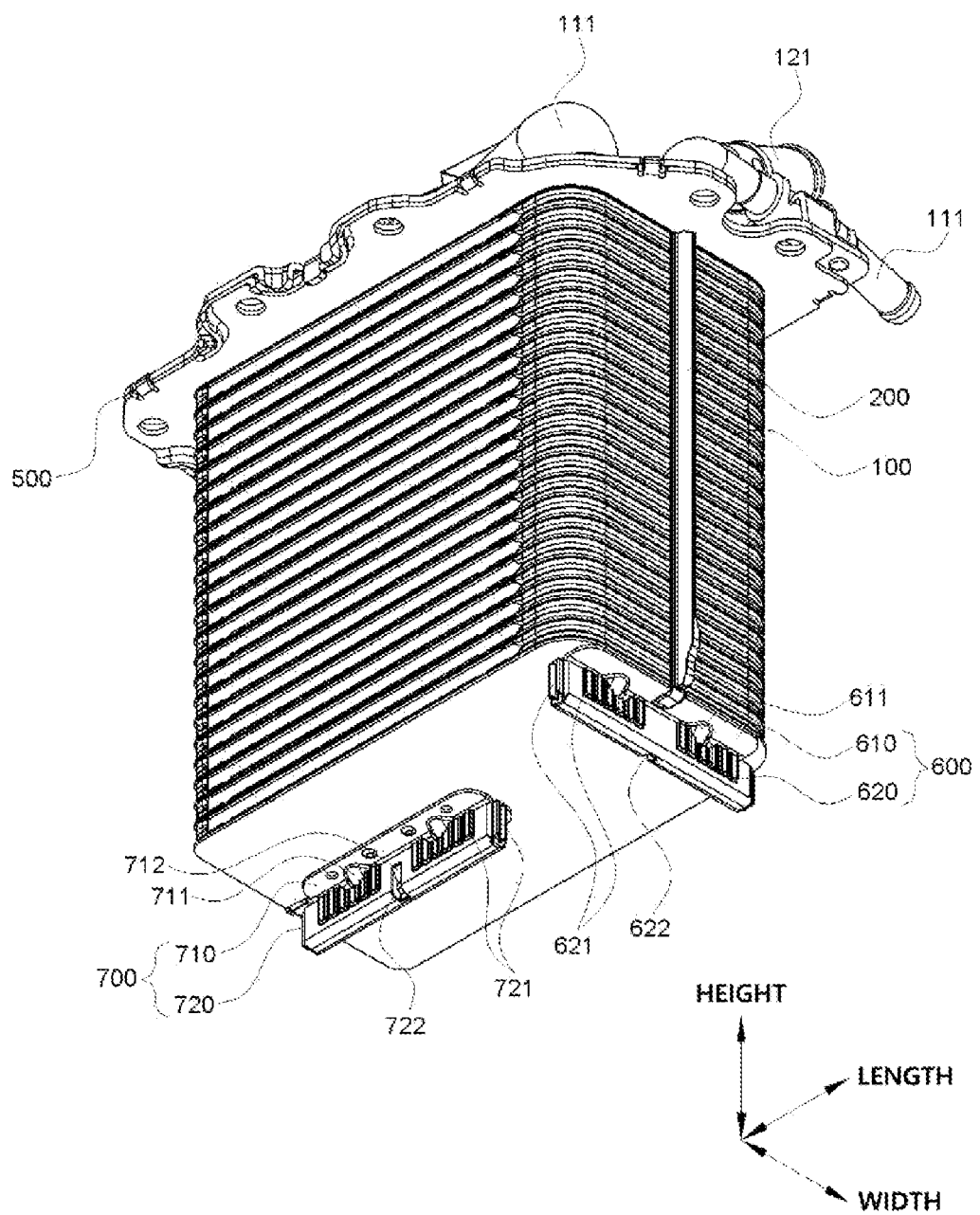
Figure 4:
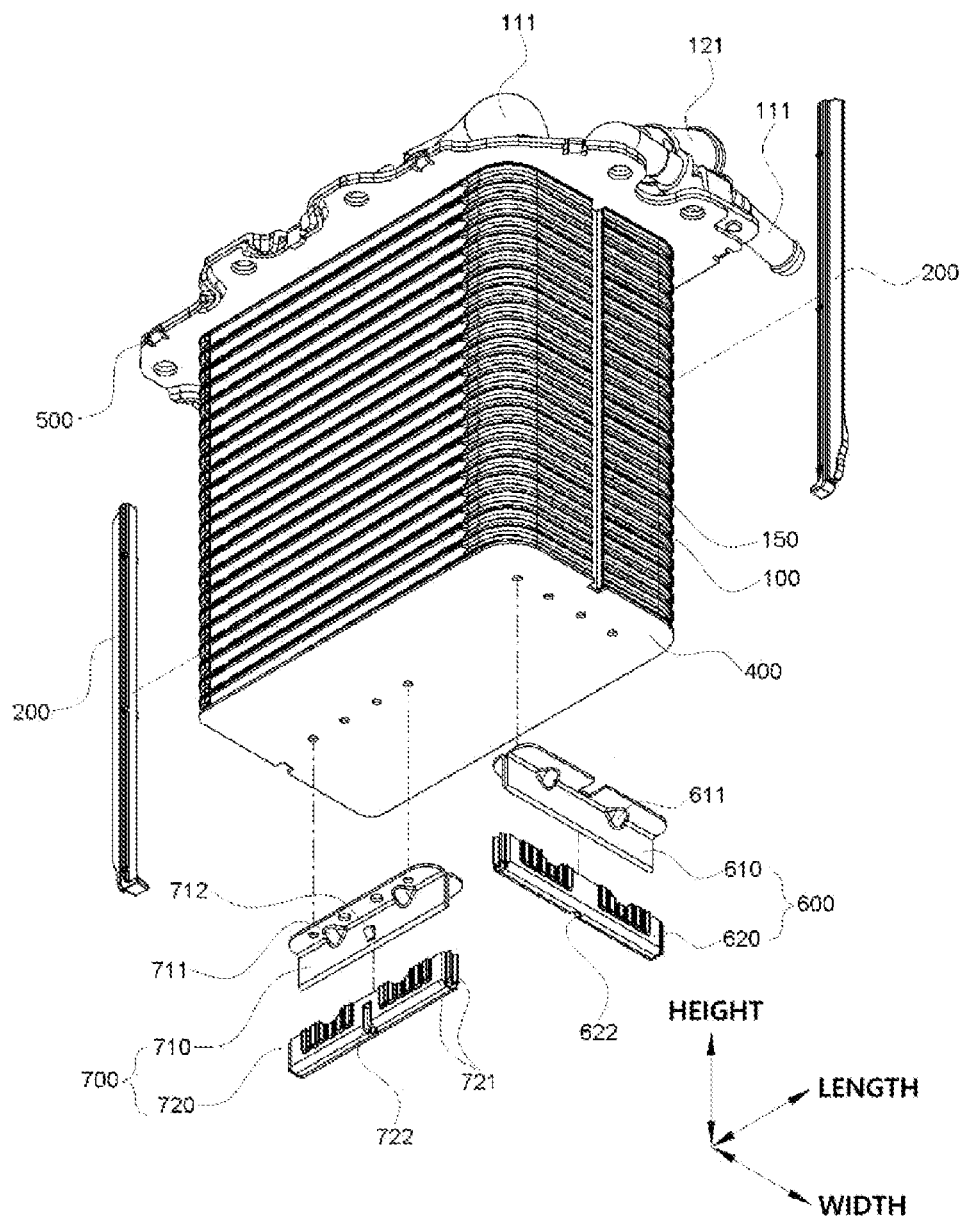
Figure 5:
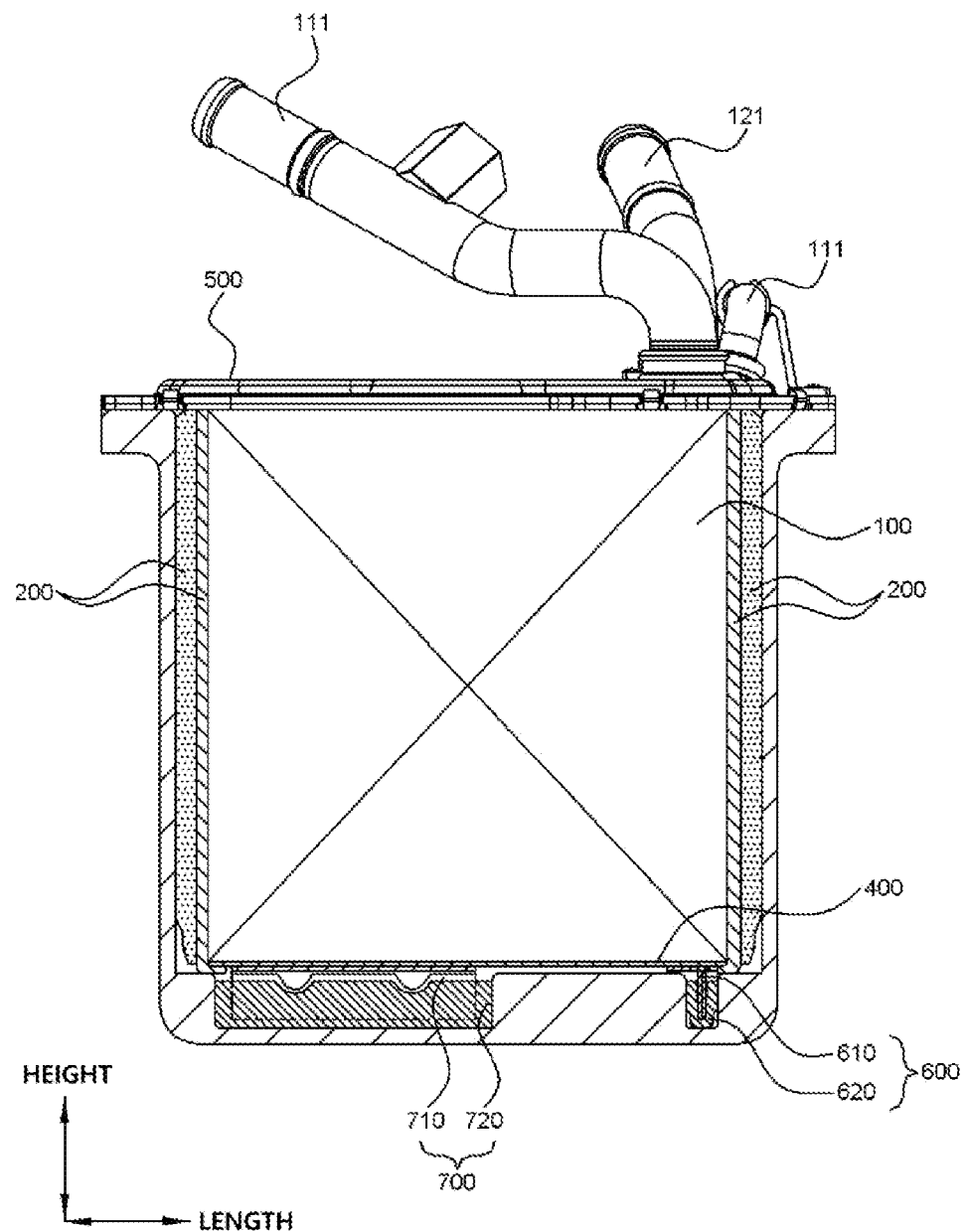
FIG. 5 is a front cross-sectional view illustrating a heat exchanger according to an embodiment of the present invention.

FIGS. 2 to 4 are an exploded perspective view and an assembled perspective view illustrating a heat exchanger according to an embodiment of the present invention, and FIG. 5 is a front cross-sectional view illustrating a heat exchanger according to an embodiment of the present invention.

As illustrated in FIGS. 2 to 5, the heat exchanger according to an embodiment of the present invention may largely include a core portion 100, an upper reinforcing plate 500, a lower reinforcing plate 400, a first support portion 600, and a second support portion 700, and may further include a housing 800.

The core portion 100 may include an inlet tank portion, an outlet tank portion, and tubes, and may further include fins interposed and coupled between neighboring tubes spaced apart from each other. The input tank portion is a portion in which cooling water introduced from the outside may be stored and may flow along the inside, and may be formed along a height direction to be connected to inlet pipes 111. The outlet tank portion is a portion in which a space in which the cooling water heat-exchanged with air passing between the tubes may be collected and stored and may flow along the inside and be discharged to the outside is formed, and may be formed along the height direction so as to be connected to an outlet pipe 121. The tube is a portion having one end connected to the inlet tank portion and the other end connected to the outlet tank portion to form a cooling water flow passage through which the cooling water may be heat-exchanged with the air while flowing, and a plurality of tubes may be arranged to be spaced apart from each other in the height direction and formed side by side. In this case, the inlet tank portion, the outlet tank portion, and the tubes may be formed in various shapes. For example, the inlet tank portion, the outlet tank portion, and the tubes may be formed in a stacked heat exchanger shape in which a plurality of plates are stacked and formed integrally or may be formed in an extruded tube-type heat exchanger shape in which a plurality of tubular tubes are connected and fixed to a tubular tank or header tanks. The fins for improving heat exchange efficiency may be interposed between the tubes. For example, the fins may be formed in a corrugated fin shape and coupled to the tubes. In addition, the inlet tank portion and the outlet tank portion may be disposed on one side or both sides in a length direction, but it has been illustrated in the drawings that the inlet tank portion and the outlet tank portion are formed on one side in the length direction. Here, the core portion 100 may be formed in a shape in which the cooling water introduced into the inlet tank portion flows in a form in which the cooling water makes a U-turn along the tubes and is then discharged to the outside through the outlet tank portion. Thus, the cooling water introduced from the outside through the inlet pipe 111 may be distributed to the tubes while flowing in the height direction along the inlet tank portion of the core portion 100, flow along the tubes in the length direction, makes a U-turn, be collected in the outlet tank portion, flow in the height direction, and be then discharged to the outside through the outlet pipe 121. In this case, the air may flow from a front side of the core portion 100 to a rear side of the core portion 100 in a width direction, and may be heat-exchanged and cooled while passing between the tubes. In addition, the core portion 100 may be formed in a rectangular hexahedron shape of which the length direction is longer than the width direction when viewed on a plane in the length direction and the width direction, and may be formed in a round shape at edges where the length side and the width direction meet each other.

The upper reinforcing plate 500 may be coupled to an upper end of the core portion 100, such that the core portion 100 may be formed in a shape in which it is fixed to a lower surface of the upper reinforcing plate 500. In addition, the upper reinforcing plate 500 is formed to be wider than the core portion 100 in the length direction and the width direction, and may thus be formed in a flange shape in which the upper reinforcing plate 500 protrudes outward of a circumference of an upper surface of the core portion 100. In addition, a plurality of through holes penetrating through upper and lower surfaces of the upper reinforcing plate 500 may be formed at positions between edges of a circumference of the upper reinforcing plate 500 and side surfaces of the core portion 100 in the length direction or the width direction along the circumference of the upper reinforcing plate 500 so as to be spaced apart from each other. Thus, the upper reinforcing plate 500 may serve to reinforce a structural strength of an upper side of the core portion 100, and may be coupled and fixed to a housing 800 to be described later through the through holes using separate fastening means. That is, a flange-shaped portion of the upper reinforcing plate 500 in which the through holes are formed may serve as coupling portions capable of being coupled to another component or structure.

The lower reinforcing plate 400 may be coupled to and fixed to a lower end of the core portion 100, and may serve to reinforce a structural strength of a lower side of the core portion 100.

The first support portion 600 and the second support portion 700 serve to absorb vibrations, and may be coupled to and fixed to a lower surface of the lower reinforcing plate 400. In addition, the first support portion 600 may be disposed on one side of the lower reinforcing plate 400 in the length direction, the second support portion 700 may be disposed on the other side of the lower reinforcing plate 400 in the length direction, and the first support portion 600 and the second support portion 700 may be disposed to be spaced apart from each other in the length direction. In addition, the first support portion 600 and the second support portion 700 may be supported by a housing 800 to be described later or another component or structure.

The housing 800 may be formed in a concave container shape. In addition, the housing 800 may be formed in a shape in which an upper surface thereof is opened, may have an air inlet 810 which is formed on one side thereof in the length direction and through which air is introduced, and an air outlet 820 which is formed on the other side thereof in the length direction and through which the air is discharged. In addition, fastening holes to which the fastening means are coupled may be formed at positions of the housing 800 corresponding to the through holes formed along the circumference of the upper reinforcing plate 500 along a circumferential portion of an upper end of the housing 800. Thus, the core portion 100 is inserted and accommodated into the housing 800, and the upper reinforcing plate 500 may be fixed by a separate fastening means in a state in which the edge portion thereof is in contact with the upper end of the housing 800. In addition, the housing 800 may have insertion grooves 830 and 840 concavely formed in an inner bottom surface thereof at positions corresponding to the first support portion 600 and the second support portion 700, and the first support portion 600 and the second support portion 700 may be inserted into and supported by the insertion grooves 830 and 840.

Thus, vibrations transferred to the lower side of the core portion 100 are decreased by the first support portion 600 and the second support portion 700, such that durability of the core portion 100 may be improved.

Figure 6:
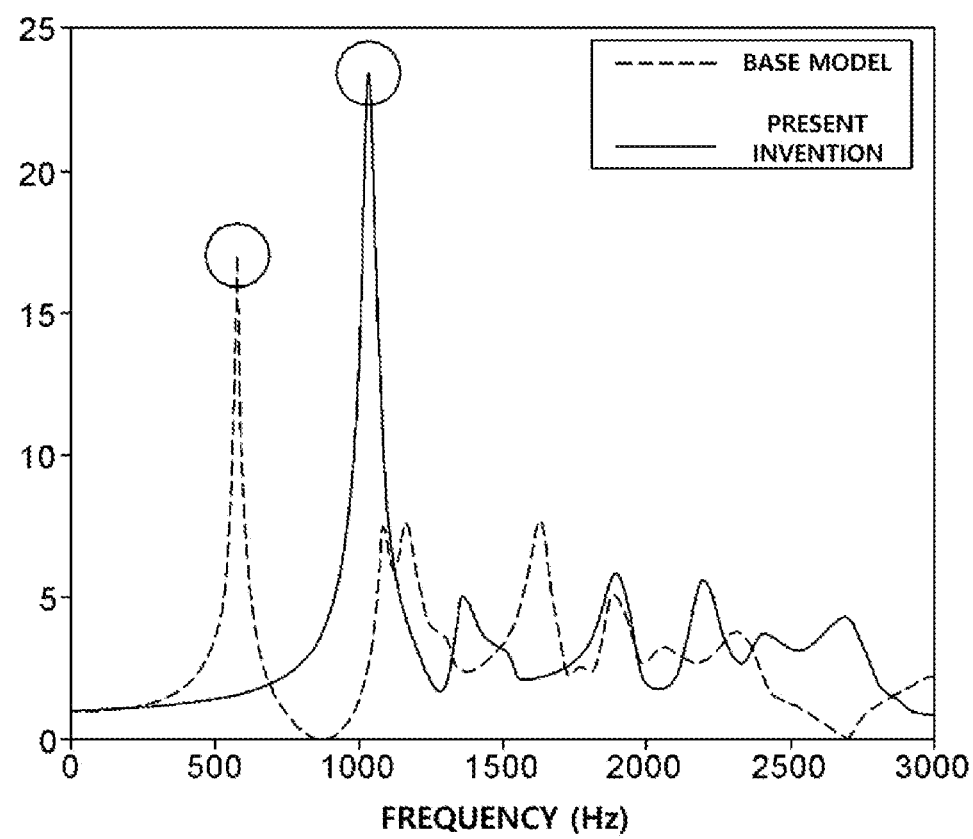
FIG. 6 is a graph for comparing simulation results obtained by performing excitation tests on the heat exchanger according to an embodiment of the present invention and a base model.

FIG. 6 is a graph for comparing simulation results obtained by performing excitation tests on the heat exchanger according to an embodiment of the present invention and a base model.

As illustrated in FIG. 6, in an excitation simulation result tested using a base model in which only one support portion was formed at a lower end of a core portion in which a damage mode was reproduced, a resonance frequency of the core portion in a width direction was 580.6 Hz, while in an excitation simulation result test in the heat exchanger in which two support portions at the lower end of the core portion 100 as in the present invention, a resonance frequency of the core portion in the width direction was 1035.4 Hz. That is, the resonance frequency of the core portion 100 in the width direction according to the present invention was in a range of 1000 Hz or more, which is not relatively dangerous. In addition, in this case, as a result of testing a stress concentration in a specific portion where damage to the core portion occurs due to vibrations of the resonance frequency, while a stress of the specific portion of the base model in the width direction was 50.4 MPa, while a stress of the specific portion of the core portion according to the present invention was 10.1 MPa. That is, it may be seen that in the present invention, a stress concentration generated in the specific portion of the core portion according to a change of the resonance frequency is solved, such that damage to the core portion due to the vibrations may be prevented.

In addition, the first support portion 600 may be formed to be longer in the width direction than in the length direction, and the second support portion 700 may be formed to be longer in the length direction than the width direction. That is, as illustrated in the drawings, the first support portion 600 is formed to be elongated along the width direction, such that a long axis of the first support portion 600 in which a long side is formed may be disposed in parallel with the width direction, and the second support portion 700 is formed to be elongated along the length direction, such that a long axis of the second support portion 700 in which a long side is formed may be disposed in parallel with the length direction. Thus, the upper reinforcing plate 500 may be coupled to the housing 800 by fastening means such as bolts to absorb vibrations in the height direction, the first support portion 600 may absorb vibrations in the length direction, and the second support portion 700 may absorb vibrations in the width direction. In addition, rotational vibrations about the height direction axis may also be decreased by the first support portion 600 and the second support portion 700. In addition, an extension line of the long axis of the first support portion 600 and an extension line of the long axis of the second support portion 700 may be formed to intersect each other, and may be formed to be perpendicular to each other. In addition, the extension lines may be formed to be perpendicular to a central axis direction of the coupling portions (through holes) of the upper reinforcing plate.

In addition, the first support portion 600 may include a first bracket 610 and a first anti-vibration member 620. In addition, the first bracket 610 may be formed in a T shape and may be formed in a shape in which a protruding portion extends downward from a reinforcing plate coupling portion, which is a horizontal portion of an upper side, the reinforcing plate coupling portion may be coupled to and fixed to the lower reinforcing plate 400, and the first anti-vibration member 620 may have a groove formed to be downwardly concave and may be fitted and fixed onto the protruding portion so that the protruding portion, which is a vertical portion extending downward from the reinforcing plate coupling portion of the first bracket 610, is inserted into the groove. Here, the first bracket 610 may be formed of a metal material for structural rigidity, and the first anti-vibration member 620 may be formed of an elastic material such as rubber or resin so as to absorb vibrations. Similarly, the second support portion 700 may include a second bracket 710 and a second anti-vibration member 720, the second bracket 710 may be formed in a T shape and may be formed in a shape in which a protruding portion extends downward from a reinforcing plate coupling portion, which is a horizontal portion of an upper side, the reinforcing plate coupling portion may be coupled to and fixed to the lower reinforcing plate 400, and the second anti-vibration member 720 may have a groove formed to be downwardly concave and may be fitted and fixed onto the protruding portion so that the protruding portion, which is a vertical portion extending downward from the reinforcing plate coupling portion of the second bracket 710, is inserted into the groove. Here, the second bracket 710 may also be formed of a metal material for structural rigidity, and the second anti-vibration member 720 may also be formed of an elastic material such as rubber or resin so as to absorb vibrations.

In this case, the first support portion 600 and the second support portion 700 are formed in the same configuration and shape, so that the first support portion 600 and the second support portion 700 may be manufactured and used in common as one type of component. Thus, the number of components may be decreased, such that manufacturing and management may be easily performed.

Figure 7:
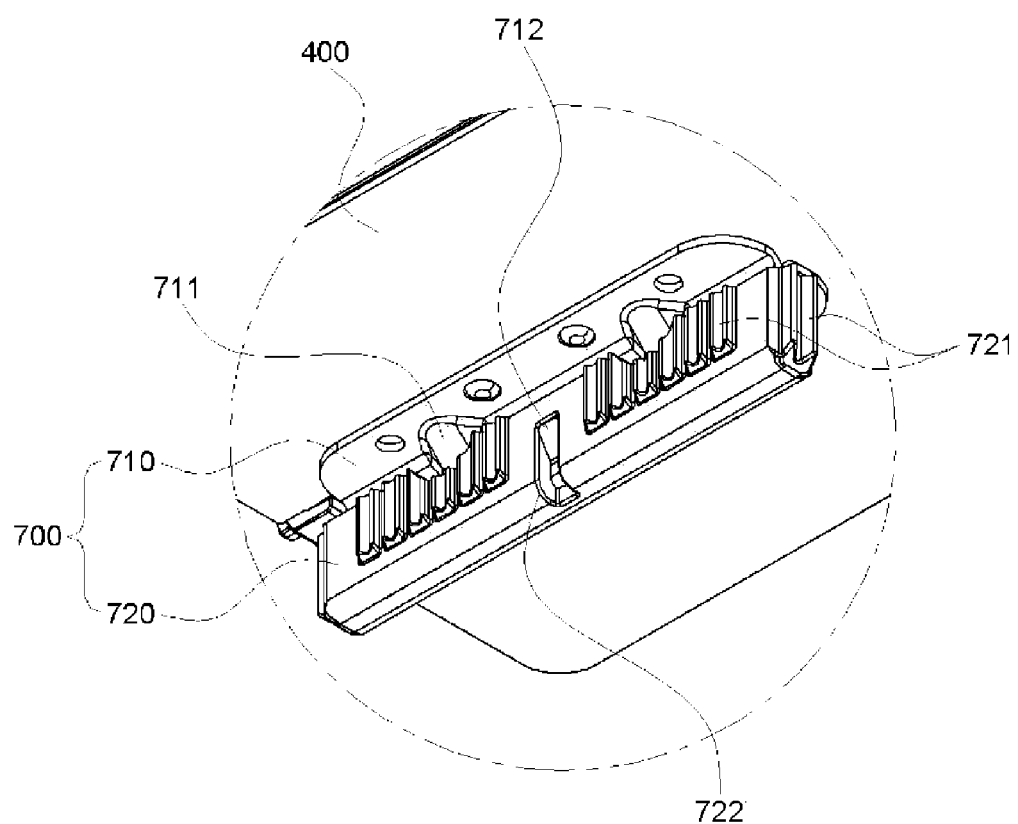
FIG. 7 is a perspective view illustrating a second support portion of the heat exchanger according to an embodiment of the present invention.
Figure 8:
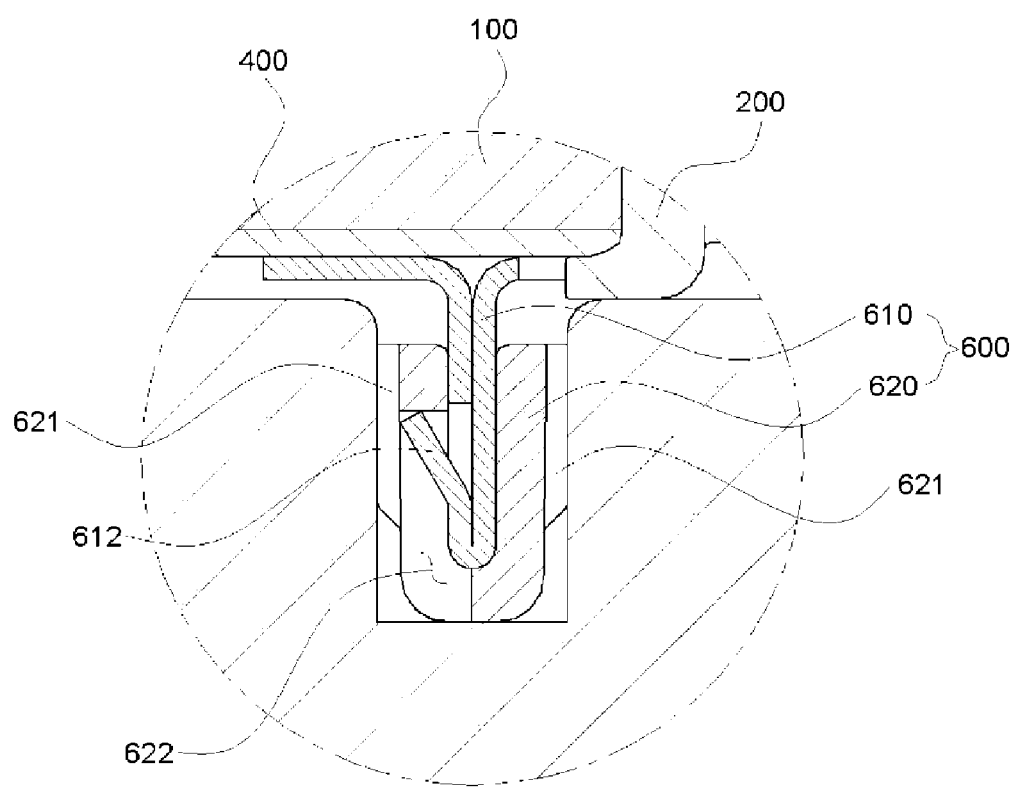
FIG. 8 is a partial cross-sectional view illustrating a first support portion of the heat exchanger according to an embodiment of the present invention.

FIG. 7 is a perspective view illustrating a second support portion of the heat exchanger according to an embodiment of the present invention, and FIG. 8 is a partial cross-sectional view illustrating a first support portion of the heat exchanger according to an embodiment of the present invention.

As illustrated in FIGS. 7 and 8, the first bracket 610 of the first support portion 600 may have a hooking protrusion 612 protruding in a hook shape from a side surface of the protruding portion, which is a portion onto which the first anti-vibration member 620 is fitted, and the first anti-vibration member 620 may have a hooking groove 622 formed at a position corresponding to the hooking protrusion 612 of the first bracket 610 in a concave shape or a shape in which it penetrates through inner and outer surfaces. Thus, the hooking protrusion 612 is inserted and hooked into the hooking groove 622, such that the first anti-vibration member 620 may be coupled to the first bracket 610 so as not to be separated from the first bracket 610 in an opposite direction to a direction in which the first anti-vibration member 620 is fitted. Similarly, the second bracket 710 of the second support portion 700 may have a hooking protrusion 712 protruding from a side surface of the protruding portion, which is a portion onto which the second anti-vibration member 720 is fitted, and the second anti-vibration member 620 may have a hooking groove 722 formed at a position corresponding to the hooking protrusion 712. Thus, the hooking protrusion 712 is inserted and hooked into the hooking groove 722, such that the second anti-vibration member 720 may be coupled to the second bracket 710 so as not to be separated from the second bracket 710 in an opposite direction to a direction in which the second anti-vibration member 720 is fitted.

In addition, the first bracket 610 of the first support portion 600 may be formed by bending one flat plate. Thus, the first bracket 610 may be formed in a shape in which the reinforcing plate coupling portion is formed in parallel with a plane in the length direction and the width direction and the protruding portion extends downward from a central portion of the reinforcing plate coupling portion. In addition, in the first bracket 610, connection portions 611 having the shape of connecting the reinforcing plate coupling portion and the protruding portion to each other in order to reinforce a strength at a portion where the reinforcing plate coupling portion and the protruding portion that are formed in a T shape meet each other may be formed. In this case, the connection portions 611 may be formed by pressing one flat plate using a mold for bending one flat plate when forming the first bracket 610 by bending one flat plate, and reinforcing ribs may be formed in a protruding shape between the reinforcing plate coupling portion and the protruding portion having the T shape through an additional pressing process after bending one flat plate in the T shape. Similarly, the second bracket 710 of the second support portion 700 may be formed by bending one flat plate, and connection portions 711 may be formed in a protruding shape between the reinforcing plate coupling portion and the protruding portion.

In addition, the first bracket 610 of the first support portion 600 and the second bracket 710 of the second support portion 700 may be formed in a T shape, and the reinforcing plate coupling portions of the first bracket 610 and the second bracket 710 may be fixed to the lower surface of the lower reinforcing plate 400 fixed to the lower end of the core portion 100 by welding or rivets.

In addition, the first anti-vibration member 620 of the first support portion 600 and the second anti-vibration member 720 of the second support portion 700 have support protrusions 621 and 721 protruding from at least one of side surfaces thereof in the width direction or the length direction, respectively. In addition, the support protrusions 621 and 721 may extend along the height direction in which the first anti-vibration member 620 and the second anti-vibration member 720 are inserted into the insertion grooves 830 and 840, respectively. Thus, the first support portion 600 and the second support portion 700 may be easily inserted and assembled into the insertion grooves 830 and 840 formed in the housing 800, respectively. In addition, in a state in which the first support portion 600 and the second support portion 700 are inserted into the insertion grooves 830 and 840 formed in the housing 800, respectively, the support protrusions 621 and 721 of the first anti-vibration member 620 and the second anti-vibration member 720 may be in contact with and supported by surfaces of the insertion grooves in the width direction and the length direction, and lower surfaces of the first anti-vibration member 620 and the second anti-vibration member 720 may be in contact with and supported by insertion grooves 830 and 840. In addition, in this case, surfaces of the first anti-vibration member 620 and the second anti-vibration member 720 in the width direction and the length direction are spaced apart from the surfaces of the insertion grooves 830 and 840 in the width direction and the length direction, and thus, contact areas are decreased by the support protrusions 621 and 721, such that the first support portion 600 onto which the first anti-vibration member 620 is fitted and the second support portion 700 onto which the second anti-vibration member 720 is fitted may be easily inserted into the insertion grooves 830 and 840, respectively.

In addition, the core portion 100 may have sealing member insertion grooves 150 concavely formed along the height direction in both side surfaces thereof in the length direction, and sealing members 200 may be inserted and coupled into the insertion grooves 150. In addition, in the sealing members 200, lip seals having a small thickness than portions inserted into the insertion grooves 150 may protrude outward from an outer surface of the core portion 100. In addition, an internal space of the housing 800 is formed to be wider than the core portion 100, such that the core portion 100 may be easily inserted into the housing 800 when it is inserted into the housing 800, and in a state in which the core portion 100 is inserted into the housing 800, the lip seals of the sealing members are in contact with and closely adhered to inner surfaces of side walls of the housing 800 in the length direction, such that spaces between the inner surfaces of the side walls of the housing 800 in the length direction and the side surfaces of the core portion 100 in the length direction may be sealed by the sealing members 200. Thus, the air introduced into the air inlet 810 of the housing 800 may pass between the tubes of the core portion 100 and be then discharged through the air outlet 820.

The present invention is not limited to the embodiments described above, and may be applied to various fields. In addition, the present invention may be variously modified by those skilled in the art to which the present invention pertains without departing from the gist of the present invention claimed in the claims.

[Detailed Description of Main Elements]

| | |
|---|---|
| 100: core portion | 111: inlet pipe |
| 121: outlet pipe | 150: sealing member insertion groove |
| 200: sealing member | 400: lower reinforcing plate |
| 500: upper reinforcing plate | 600: first support portion |
| 610: first bracket | 611: connection portion |
| 612: hooking protrusion | 620: first anti-vibration member |
| 621: support protrusion | 622: hooking groove |
| 700: second support portion | 710: second bracket |
| 711: connection portion | 712: hooking protrusion |
| 720: first anti-vibration member | 721: support protrusion |
| 722: hooking groove | 800: housing |
| 810: air inlet | 820: air outlet |
| 830, 840: insertion groove | |

The invention claimed is:

1. A heat exchanger comprising:
a core portion including an inlet tank portion and an outlet tank portion in which spaces in which cooling water is stored and flows are formed and a plurality of tubes each having one end connected to the inlet tank portion and the other end connected to the outlet tank portion to form a flow passage through which the cooling water flows;
an upper reinforcing plate coupled to an upper end of the core portion, having an inlet pipe and an outlet pipe formed to communicate with the inlet tank portion and the outlet tank portion, respectively, and having coupling portions formed for fixation;
a lower reinforcing plate coupled to a lower end of the core portion;
a first support portion coupled to one side of the lower reinforcing plate in a length direction on a lower surface of the lower reinforcing plate and absorbing vibrations; and
a second support portion coupled to the other side of the lower reinforcing plate in the length direction on a lower surface of the lower reinforcing plate and absorbing vibrations,
wherein the first support portion includes:
a first bracket coupled to the lower reinforcing plate and a first anti-vibration member fitted onto the first bracket,
wherein the first anti-vibration member has a plurality of support protrusions protruding from at least one of side surfaces thereof in a width direction or the length direction, and the support protrusions extend along a height direction.

2. The heat exchanger according to claim 1, wherein the first support portion is formed to be longer in a width direction than in the length direction, and the second support portion is formed to be longer in the length direction than the width direction.

3. The heat exchanger according to claim 2, wherein an extension line of an axis of the first support portion and an extension line of the axis axis of the second support portion intersect each other.

4. The heat exchanger according to claim 3, wherein the extension lines are perpendicular to a central axis direction of the coupling portions of the upper reinforcing plate.

5. The heat exchanger according to claim 1, wherein the first bracket has a hooking protrusion protruding from a side surface of a portion onto which the first anti-vibration member is fitted, and the first anti-vibration member has a hooking groove formed at a position corresponding to the hooking protrusion, and wherein the hooking protrusion is inserted and hooked into the hooking groove.

6. The heat exchanger according to claim 1, wherein the first bracket includes a reinforcing plate coupling portion coupled to the lower reinforcing plate and a protruding portion extending downward from the reinforcing plate coupling portion.

7. The heat exchanger according to claim 6, wherein the first bracket is formed by bending one flat plate.

8. The heat exchanger according to claim 6, wherein the first bracket has connection portions formed to connect the reinforcing plate coupling portion and the protruding portion to each other.

9. The heat exchanger according to claim 1, wherein the second support portion includes a second bracket coupled to the lower reinforcing plate and a second anti-vibration member fitted onto the second bracket.

10. The heat exchanger according to claim 9, wherein the second bracket has a hooking protrusion protruding from a side surface of a portion onto which the second anti-vibration member is fitted, wherein the second anti-vibration member has a hooking groove formed at a position corresponding to the hooking protrusion, and the hooking protrusion is inserted and hooked into the hooking groove.

11. The heat exchanger according to claim 9, wherein the second bracket includes a reinforcing plate coupling portion coupled to the lower reinforcing plate and a protruding portion extending downward from the reinforcing plate coupling portion.

12. The heat exchanger according to claim 11, wherein the second bracket is formed by bending one flat plate.

13. The heat exchanger according to claim 11, wherein the second bracket has connection portions formed to connect the reinforcing plate coupling portion and the protruding portion to each other.

14. The heat exchanger according to claim 9, wherein the second anti-vibration member has a plurality of support protrusions protruding from at least one of side surfaces thereof in a width direction or the length direction, and wherein the support protrusions extend along a height direction.

15. The heat exchanger according to claim 1, further comprising a housing formed in a concave container shape, having an air inlet which is formed on one side thereof and through which air is introduced, and having an air outlet which is formed on the other side thereof and through which the air is discharged,
wherein the core portion is inserted and accommodated into a concave inner portion of the housing, the upper reinforcing plate is coupled and fixed to an upper end portion of the housing, and the first support portion and the second support portion are in contact with and supported by an inner bottom of the housing.

16. The heat exchanger according to claim 15, wherein the housing has insertion grooves concavely formed in an inner bottom surface thereof at positions corresponding to the first support portion and the second support portion, and the first support portion and the second support portion are inserted into and supported by the insertion grooves, respectively.

* * * * *